(12) United States Patent
Ikeya et al.

(10) Patent No.: US 9,911,997 B2
(45) Date of Patent: Mar. 6, 2018

(54) FUEL CELL SYSTEM

(71) Applicant: SUZUKI MOTOR CORPORATION, Shizuoka (JP)

(72) Inventors: Kengo Ikeya, Shizuoka (JP); Toshihide Tachibana, Shizuoka (JP); Yoshimasa Matsumoto, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 15/157,603

(22) Filed: May 18, 2016

(65) Prior Publication Data

US 2016/0344050 A1    Nov. 24, 2016

(30) Foreign Application Priority Data

May 20, 2015 (JP) ................... 2015-102431

(51) Int. Cl.
*H01M 8/04992* (2016.01)
*H01M 8/04537* (2016.01)

(52) U.S. Cl.
CPC ... *H01M 8/04992* (2013.01); *H01M 8/04559* (2013.01); *H01M 8/04589* (2013.01); *H01M 8/04619* (2013.01); *H01M 2250/20* (2013.01); *Y02T 90/32* (2013.01)

(58) Field of Classification Search
CPC ................... H01M 8/04992; H01M 8/04559
See application file for complete search history.

(56) References Cited

U.S. PATENT DOCUMENTS

2004/0166381 A1*  8/2004 Muramoto ........ H01M 8/04007
429/431

FOREIGN PATENT DOCUMENTS

JP        2009-99393 A        5/2009

* cited by examiner

*Primary Examiner* — Olatunji Godo
(74) *Attorney, Agent, or Firm* — Rothwell, Figg, Ernst & Manback, P.C.

(57) ABSTRACT

A fuel cell stack 5 adapted for an electrochemical reaction of a fuel gas to generate an electric power is provided with a working point measuring section 51 for measuring a generation voltage and a generation current of the fuel cell stack 5, and connected to a controller 7 including an output characteristic map memory 72 for storing output characteristics of the fuel cell stack 5, and a potential output power estimator 71 for estimating a potential output power of the fuel cell stack 5 based on a combination of a current generation voltage $V_O$ and a current generation current $I_O$ measured by the working point measuring section 51 and pieces of information stored in the output characteristic map memory 72.

4 Claims, 4 Drawing Sheets

FUEL CELL SYSTEM

CROSS-REFERENCE TO RELATED APPLICATION

This application is based upon and claims the benefit of priority from Japanese Patent Application No. 2015-102431, filed May 20, 2015, the entire contents of which are incorporated herein by reference.

BACKGROUND OF INVENTION

Technical Field

This invention relates to fuel cell systems, and specifically to, fuel cell systems adapted to estimate output power that can be output by an involved fuel cell.

Background Techniques

There are known fuel cells employing electrochemical reactions for generating electric power. Such fuel cells are generally made up as a fuel cell stack composed of a set of stacked multiple minimal constituent units called unit cells. Unit cells have a structure including an anode electrode supplied with hydrogen, and a cathode electrode supplied with oxygen in the air, each respectively having at one side thereof a diffusion layer and a catalyst layer laminated thereon in order. The sides each having a diffusion layer and a catalyst layer laminated thereon are both set inside, with a central electrolyte interposed in between. The anode electrode and the cathode electrode have electric power output terminals thereof connected to an external circuit. The external circuit is connected to loads such as a motor.

In such the unit cell, hydrogen molecules supplied to the anode electrode are changed at the catalyst layer of the anode electrode to active hydrogen molecules, and further to hydrogen ions, discharging electrons. Such hydrogen ions are accompanied by moisture contained in the electrolyte, to move in this electrolyte, from the anode electrode toward the cathode electrode. Discharged electrons move to the cathode electrode, via the external circuit connected to the anode electrode. Such movements of electrons make electric currents conducted through electric loads connected to the external circuit. On the other hand, oxygen molecules supplied to the cathode electrode accept electrons in the catalyst layer, where electrons are moved from the external circuit, and are changed to oxygen ions to be combined with hydrogen ions moved thereto through the electrolyte, to produce water.

Such being the case, for the unit cell to have an outgoing electric current, the electrolyte needs moisture. As generally known, the electrolyte has an increased ionic conductivity, as it has a higher relative humidity. However, too much moisture gives rise to flooding phenomena impeding movements of hydrogen gases, constituting a difficulty to conduct electric currents. Such being the case, fuel cells tend to exhibit varied performances in power generation, depending on a degree of dryness of involved electrolytes.

Further, fuel cells tend to have lowered performances in power generation, under low temperature conditions such as those below the freezing point involving catalyst layers with lowered activities or electrolytes with lowered conductivities.

Such being the case, fuel cells have varied performances in power generation, depending on a dryness degree and a temperature of involved electrolytes. Therefore, when using a fuel cell for supplying electric power, one is unable to determine electric power that can be output from the fuel cell, having anxieties about un-preferable situations involving, for instance, conduction of an excessive electric current from the fuel cell causing, at the fuel cell, a reduced voltage to be output or a short in electric power to be output, resulting in non-conforming performances of loads.

For a fuel cell, the performance in power generation is defined as an output characteristic of the fuel cell. There has been a fuel cell system disclosed in Japanese Patent Application Publication No. 2009-99393 (referred herein to as a patent literature 1) including employing an output characteristic of a fuel cell determined from a temperature and an impedance of the fuel cell, as a basis to estimate electric power that can be output from the fuel cell.

SUMMARY OF INVENTION

However, fuel cells have output characteristics variable in dependence on dryness of electrolytes thereof, as well. Therefore, when electric power that can be output by an involved fuel cell is estimated on the basis of an output characteristic determined from a temperature and an impedance of the fuel cell, like the fuel cell system disclosed in the patent literature 1, there can be a significant error caused between estimated output power and actual output power with an increased tendency, as a problem.

This invention has been devised in view of the problem in the past.

It is an object of this invention to provide a fuel cell system adapted to estimate electric power that can be output by an involved fuel cell, with an increased precision.

To achieve the objective, according to aspects of this invention, there is provided a fuel cell system comprising a fuel cell configured for an electrochemical reaction of a fuel gas to generate an electric power, a working point measuring section configured to measure a working point defined by a combination of a generation voltage and a generation current of the fuel cell, an output characteristic map memory configured to store a set of maps adapted to map output characteristics of the fuel cell, and a potential output power estimator configured to estimate a potential output power of the fuel cell based on a combination of a current generation voltage and a current generation current measured by the working point measuring section and a set of pieces of information stored in the output characteristic map memory.

According to the aspects of this invention, there is provided a fuel cell system adapted to estimate electric power that can be output by an involved fuel cell, with an increased precision.

DESCRIPTION OF EMBODIMENTS

There will be described fuel cell systems according to embodiments of this invention, with reference to the drawings.

Figure 1:
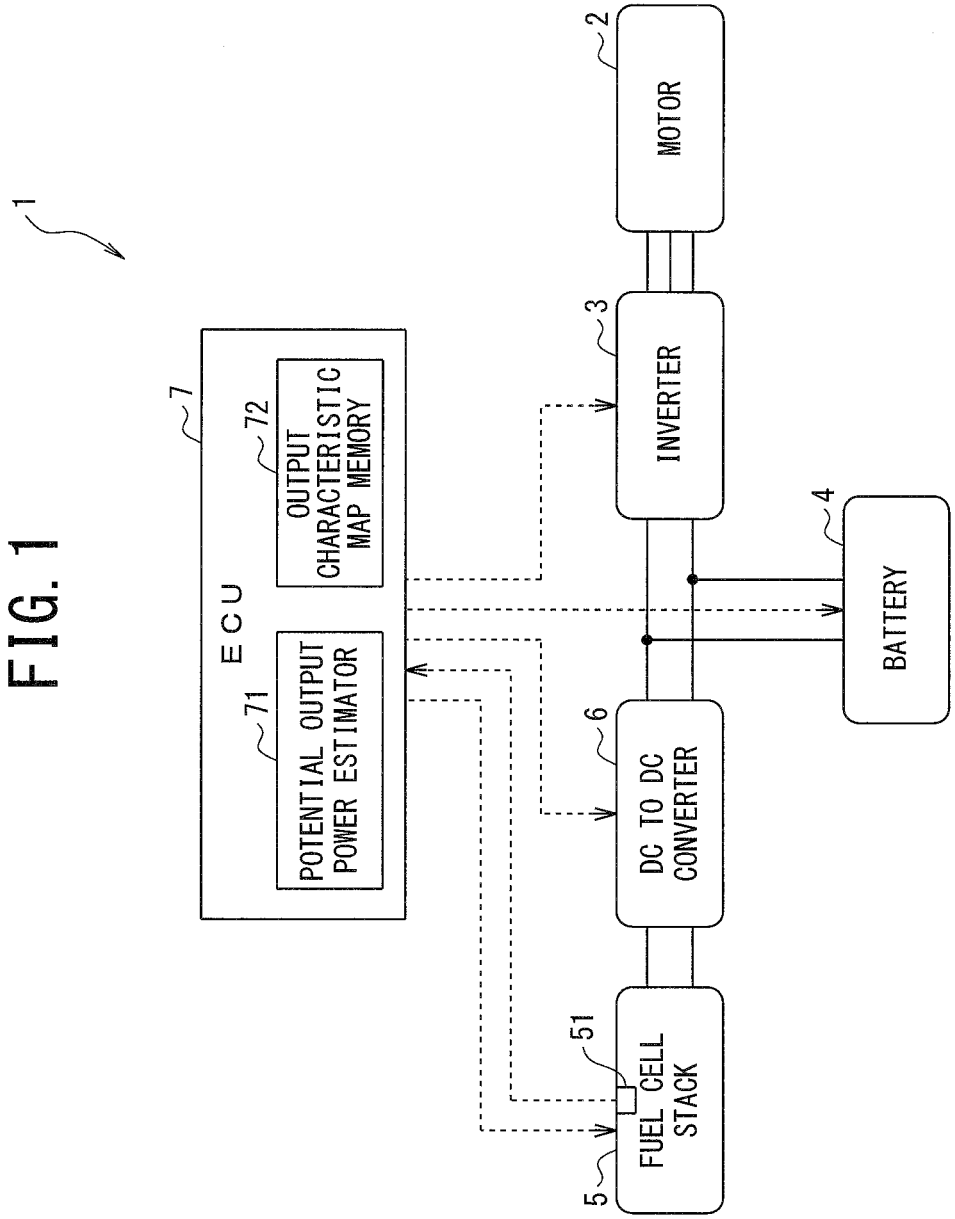
FIG. 1 is a conceptual block diagram of a vehicle including a fuel cell system, as a figure describing a fuel cell system according to an embodiment of this invention.

FIG. 1 shows a vehicle 1 furnished with a fuel cell system according to an embodiment of this invention. The vehicle 1 is made up including a motor 2, an inverter 3, a battery 4, and a fuel cell stack 5. The vehicle 1 further includes a dc (direct current) to dc converter 6, and an ECU (electronic control unit) 7 as a controller of the vehicle 1.

The motor 2 is made up as a synchronous motor including a rotor and a stator. The rotor has permanent magnets embedded therein. The stator has a combination of Y or delta connected three stator windings wound inside thereof. In the motor 2, the stator has rotating magnetic fields developed therein with a three-phase ac (alternating current) power applied thereto, and the rotor is forced to rotate by the rotating magnetic fields, producing a rotating torque as a motive power. The rotating torque produced at the motor 2 is speed-changed by a non-depicted transmission, and transmitted to non-depicted drive wheels, to make the vehicle 1 travel. Further, when the vehicle 1 decelerated, there is a reverses rotating torque transmitted as a motive power from the drive wheels to the motor 2, forcing the motor 2 work as a generator for generating a regenerative power. The motor 2 is connected to the inverter 3.

The inverter 3 is adapted for converting a dc power supplied thereto into a three-phase ac power, to supply to the motor 2, controlling an output torque of the motor 2. The inverter 3 follows a torque command signal output from the ECU 3, to control currents of the three-phase ac power to be supplied to the motor 2, to have the motor 2 output a rotating torque commanded by the torque command signal. Further, the inverter 3 is adapted for converting a three-phase ac power output as a regenerative power from the motor 2 into a dc power, to charge to the battery 4.

The battery 4 is made up by serial connected secondary cells each composed of a nickel storage cell or lithium storage cell. The battery 4 is adapted to have a dc power (in watt/sec) supplied thereto from the inverter 3 or the dc to dc converter 6, and charged therein to store in the form of an electric energy (in watt). The battery 4 is adapted to have an electric energy (in watt) stored therein, and discharged therefrom in the faun of a dc power (in watt/sec) to supply to the inverter 3.

The fuel cell stack 5 is adapted to have a combination of a fuel gas such as hydrogen and an oxidant gas containing oxygen, electrochemically reacted in between through electrolytes therein, to directly take up electric energies from pairs of electrodes each provided at both sides of an involved electrolyte. The fuel cell stack 5 has a working point defined as a combination of 'a dc voltage developed between external output terminals thereof' (referred herein to sometimes as 'a generation voltage') and 'a dc current conducted through the external terminals' (referred herein to sometimes as 'a generation current'). The fuel cell stack 5 is adapted, under control of the ECU 7, to output 'a dc power defined as a product of a generation voltage and a generation current' (referred herein to sometimes as 'an output power') thereof, to the dc to dc converter 6. The fuel cell stack 5 includes a working point measuring section 51 for measuring a generation voltage and a generation current thereof, to thereby detect a working point of the fuel cell stack 5. The fuel cell stack 5 is adapted to transmit to the ECU 7 a set of pieces of information including data on a generation voltage and a generation current, as they are measured by the working point measuring section 51

The dc to dc converter 6 is adapted to convert a dc power input from the fuel cell stack 5, into a dc power suitable for supply to the inverter 3 or the battery 4, to be output. The dc to dc converter 6 has an output power thereof controlled by the ECU 7. The dc to dc converter 6 has an input power thereof controlled by controlling an output power of the fuel cell stack 5.

The ECU 7 is made up by a computer unit including a CPU (central processing unit), a RAM (random access memory), a ROM (read only memory), a flash memory, an input port, an output port, and a network module.

At the ECU 7, the ROM has stored therein a set of programs programmed for the computer unit to work as the ECU 7, and a set of control data including various maps and various control constants. The computer unit is adapted to function as the ECU 7, by the programs in the ROM to be executed at the CPU, as necessary.

At the ECU 7, the input port is connected to the working point measuring section 51 of the fuel cell stack 5, and a set of non-depicted various sensors including a vehicle speed sensor and an accelerator opening sensor. The vehicle speed sensor is adapted to detect a vehicle speed of the vehicle 1. The accelerator opening sensor is adapted to detect an amount of operation of an accelerator pedal operated by a driver, as an accelerator opening.

The sensor set includes a set of temperature sensors for detecting temperatures representative of working temperatures of the fuel cell stack 5, such as a temperature sensor for detecting a representative temperature of temperatures at electrolytes in the fuel cell stack 5, or temperature sensors for detecting a combination of a representative temperature of oxidant gases supplied to the fuel cell stack 5 and a representative temperature of discharge gases discharged from the fuel cell stack 5. The working point measuring section 51 of the fuel cell stack 5 may well include a subset of the set of temperature sensors, and may well be adapted to handle together a set of sample data including a generation voltage and a generation current measured by the working point measuring section 51, and a set of sample data including temperatures detected by such temperature sensors.

On the other hand, at the ECU 7, the output port is connected to a set of various control objects including the inverter 3, the battery 4, the fuel cell stack 5, and the dc to dc converter 6.

The ECU 7 employs a combination of a vehicle speed detected by the vehicle speed sensor and an accelerator opening detected by the accelerator opening sensor, as a basis to determine a torque required to be output at the motor 2, and sends a corresponding torque command signal to the inverter 3. The inverter 3 follows this torque command signal, to supply a corresponding power to the motor 2, to make the motor 2 output a required torque, thereby controlling a travelling of the vehicle 1. Along with this, the ECU 7 controls an output power of the dc to dc converter 6, to supply to the inverter 3.

At the ECU 7, the set of control data stored in the ROM includes a set of maps each mapping a characteristic curve continuously representing 'a relationship between a generation voltage and a generation current to be output under a prescribed working condition' (referred herein to sometimes as 'a voltage vs current characteristic' or 'an output characteristic') of the fuel cell stack 5.

Figure 2:
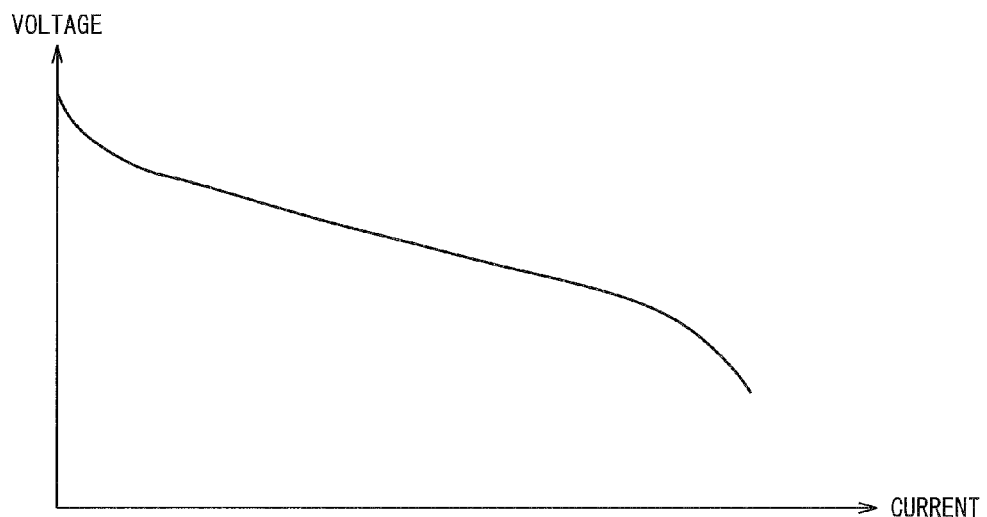
FIG. 2 is a graph showing an output characteristic of a fuel cell stack in the fuel cell system, as a figure describing a fuel cell system according to an embodiment of this invention.

FIG. 2 shows a characteristic curve representing a typical voltage vs current characteristic of the fuel cell stack 5, as it is mapped on a voltage vs current coordinate plane. As shown in FIG. 2, the fuel cell stack 5 has a decreased generation voltage (changed from upper side to lower side in the figure), as it has an increased generation current (changed from left side to right side in the figure).

In a low current region of this map (the left half section of FIG. 2) including relatively low generation currents, the fuel cell stack 5 has a decreasing generation voltage due to catalytic reactions ionizing hydrogen molecules at the anode electrode and oxygen molecules at the cathode electrode in each unit cell, with accompanying activation energies dominantly contributing to an electricity producing mechanism in the fuel cell stack 5.

On the other hand, in a high current region of that map (the right half section of FIG. 2) including relatively high generation currents, the fuel cell stack 5 has a decreasing generation voltage due to the electricity producing mechanism being controlled by a combination of a hydrogen supply rate to the anode electrode and an oxygen supply rate to the cathode electrode in each unit cell.

In addition, the fuel cell stack 5 has a decreasing generation voltage due to ohmic losses by resistances to hydrogen ions moving in the electrolyte in each unit cell, as well.

Figure 3:
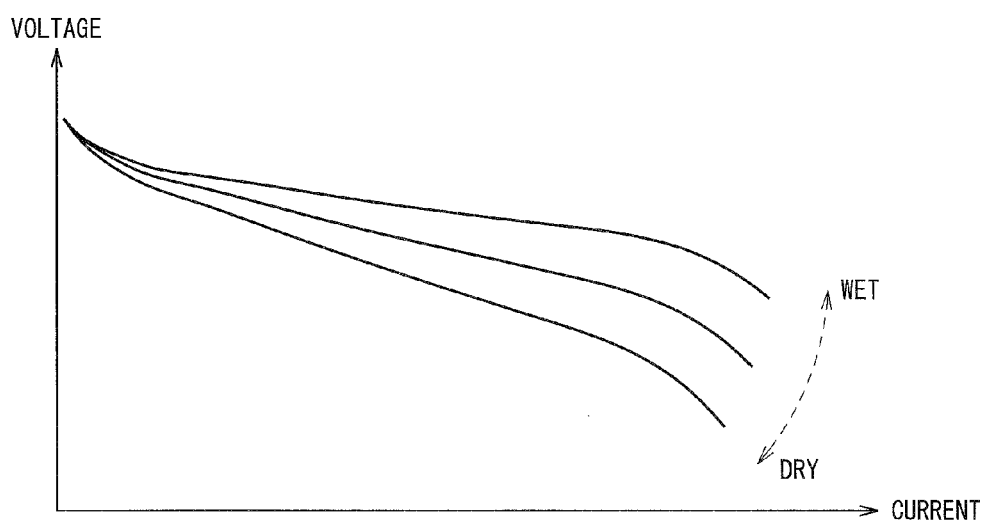
FIG. 3 is a graph showing part of a set of output characteristics variable in dependence on a dryness of electrolytes in the fuel cell stack, as a figure describing a fuel cell system according to an embodiment of this invention.

FIG. 3 shows a graph as a voltage vs current coordinate plane having mapped thereon a first characteristic curve (at the lower side of the figure) representing a voltage vs current characteristic of the fuel cell stack 5 including electrolytes having a relatively high dryness (or a relatively low wetness), a second characteristic curve (at the upper side of the figure) representing a voltage vs current characteristic of the fuel cell stack 5 including electrolytes having a relatively low dryness (or a relatively high wetness), and a third characteristic curve (in the middle of the figure) representing a voltage vs current characteristic of the fuel cell stack 5 including electrolytes having an intermediate normal dryness (or an intermediate normal wetness).

As shown in FIG. 3, the fuel cell stack 5 has a characteristic curve deformed toward a lower voltage side on the voltage vs current coordinate plane, as electrolytes have a higher dryness with an increased ohmic loss (i.e., potential drop) causing a decreased generation voltage.

The ECU 7 is adapted for employing characteristic curves representing output characteristics of the fuel cell stack 5, as a basis to estimate 'an output power that can be output' (referred herein to sometimes as 'a potential output power') at the fuel cell stack 5.

The ECU 27 includes a potential output power estimator 71, and an output characteristic map memory area 72. The output characteristic map memory area 72 is composed of a partial memory area of the ROM in the ECU 7. In the output characteristic map memory area 72 is stored a set of maps for mapping characteristic curves representing output characteristics of the fuel cell stack 5, on a voltage vs current coordinate plane.

The potential output power estimator 71 in the ECU 7 is adapted to estimate an output power of the fuel cell stack 5 that can be output in a current control time slot, based on a working point (i.e., a combination of a generation voltage and a generation current) measured by the working point measuring section 51 of the fuel cell stack 5 and a set of maps of voltage vs current characteristic curves stored in the output characteristic map memory area 72 of the ROM in the ECU 7.

Figure 4:
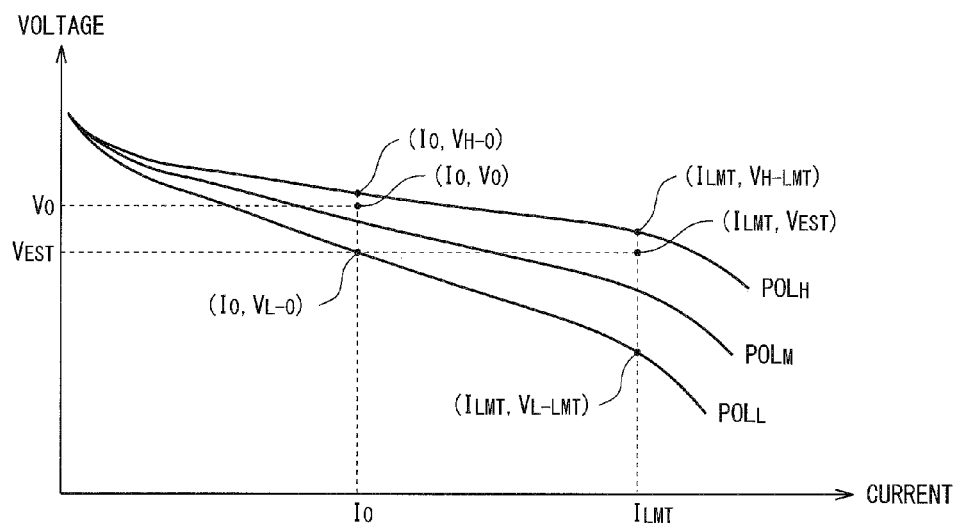
FIG. 4 is a graph showing the principle of estimating an electric power that can be output by the fuel cell stack, as a figure describing a fuel cell system according to an embodiment of this invention.

The potential output power estimator 71 is operable, as shown in FIG. 4, to map on a voltage vs current coordinate plane (in a virtual space) a combination of a first characteristic curve $POL_L$ representing an output characteristic of the fuel cell stack 5 including electrolytes having a driest or least wet (worst) state, and a second characteristic curve $POL_H$ representing an output characteristic of the fuel cell stack 5 including electrolytes having a least dry or wettest (best) state. It is noted that FIG. 4 has a third characteristic curve $POL_M$ representing an output characteristic of the fuel cell stack 5 including electrolytes having a medium dry or medium wet (normal) state, mapped on the coordinate plane for comparison. Here, the characteristic curves $POL_L$, $POL_H$, and $POL_M$ as mapped are based on empirical data stored in the output characteristic map memory area 72.

The potential output power estimator 71 is operable for calculations to recognize a first working point ($I_O$, $V_O$) defined by a combination of a generation current $I_O$ and a generation voltage $V_O$ measured by the working point measuring section 51, and a second working point ($I_{LMT}$, $V_{EST}$) defined by a combination of a potential generation current $I_{LMT}$ to be given and a potential generation voltage $V_{EST}$ to be estimated, the second working point representing a potential output power under a set of prescribed working conditions of the fuel cell stack 5. Here, the potential generation current $I_{LMT}$ is a maximal current that can be output by the fuel cell stack 5 under the set of prescribed working conditions, and determined in advance as a property value of the fuel cell stack 5, to store in the ROM of the ECU 7.

The potential output power estimator 71 is further operable for calculations to recognize:

a first coordinate ($I_O$, $V_{L-O}$) defined as a point of intersection between the measured generation current $I_O$ (specifically, a straight line $I=I_O$ extending in parallel with the voltage axis) and the first characteristic curve $POL_L$;

a second coordinate ($I_O$, $V_{H-O}$) defined as a point of intersection between the measured generation current Io and the second characteristic curve $POL_H$;

a third coordinate ($I_{LMT}$, $V_{L-LMT}$) defined as a point of intersection between the given generation current $I_{LMT}$ (specifically, a straight line $I=I_{LMT}$ extending in parallel with the voltage axis) and the first characteristic curve $POL_L$; and a fourth coordinate ($I_{LMT}$, $V_{H-LMT}$) defined as a point of intersection between the given generation current $I_{LMT}$ and the second characteristic curve $POL_H$.

The potential output power estimator 71 is further operable for calculations to recognize:

a first length ($V_O$-$V_{-O}$) defined as a vertical distance between the first working point ($I_O$, $V_O$) and the first coordinate ($I_O$, $V_{L-O}$);

a second length ($V_{H-O}$-$V_{-O}$) defined as a vertical distance between the first working point ($I_O$, $V_O$) and the second coordinate ($I_O$, $V_{H-O}$);

a third length ($V_{EST}$-$V_{L-LMT}$) defined as a vertical distance between the second working point ($I_{LMT}$, $V_{EST}$) and the third coordinate ($I_{LMT}$, $V_{L-LMT}$); and a fourth length ($V_{H-LMT}$-$V_{EST}$) defined as a vertical distance between the second working point ($I_{LMT}$, $V_{EST}$) and the fourth coordinate ($I_{LMT}$, $V_{H-LMT}$).

The potential output power estimator 71 is further operable for calculations to set up an expression (1) as an equation expressing the value of 'a ratio $\{(V_O$-$V_{L-O}):(V_{H-O}$-$V_{-O})\}$ of the first length ($V_O$-$V_{L-O}$) to the second length ($V_{H-O}$-$V_{-O}$)' equals to the value of 'a ratio $\{(V_{EST}$-$V_{L-LMT}):(V_{H-LMT}$-$V_{EST})\}$ of the third length ($V_{EST}$-$V_{L-LMT}$) to the fourth length ($V_{H-LMT}$-$V_{EST}$)', such that:

$$(V_O - V_{L-O}) : (V_{H-O} - V_{-O}) = (V_{EST} - V_{L-LMT}) : (V_{H-LMT} - V_{EST}) \quad (1).$$

The potential output power estimator 71 is then operable to calculate an expression (2) constituting a solution to the expression (1), to estimate a value of the potential generation voltage $V_{EST}$, such that:

$$V_{EST} = \{(V_O - V_{L-O}) \times V_{H-LMT} + (V_{H-O} - V_O) \times V_{L-LMT}\} / (V_{H-O} - V_{L-O}) \quad (2).$$

Such being the case, the potential output power estimator 71 is adapted for employing a pair of characteristic curves $POL_L$ and $POL_H$ (corresponding to working conditions of the fuel cell stack 5 including electrolytes in a driest state and a wettest state, respectively) as a basis to:

take out

'a combination of differences $(V_O - V_{L-O})$ and $(V_{H-O} - V_{-O})$ between an observed generation voltage $V_O$ and generation voltages $V_{L-O}$ and $V_{H-O}$ associated with an observed generation current $I_O$ on the characteristic curves $POL_L$ and $POL_H$, respectively', and 'a combination of differences $(V_{EST} - V_{L-LMT})$ and $(V_{H-LMT} - V_{EST})$ between an unknown generation voltage $V_{EST}$ and generation voltages $V_{L-O}$ and $V_{H-O}$ associated with a given generation current $I_{LMT}$ on the characteristic curves $POL_L$ and $POL_H$, respectively'; and make use of a geometric linearity (specifically, a proportionality of corresponding distances) between the combinations of differences, for calculating an interpolation between the characteristic curves $POL_L$ and $POL_H$, to estimate the generation voltage $V_{EST}$.

Therefore, the potential output power estimator 71 is adapted to estimate a potential output power (specifically, a product of the generation voltage $V_{EST}$ and the generation current $I_{LMT}$) of the fuel cell stack 5, with an increased precision.

In the example shown in FIG. 4, there is a combination of a characteristic curve $POL_L$ corresponding to a driest state of electrolytes and a characteristic curve $POL_H$ corresponding to a wettest state of electrolytes, employed for an interpolation of a linearity in between to make a calculation for estimation of a generation voltage $V_{EST}$. In this regard, there may well be a combination of a characteristic curve corresponding to a relatively dry state and a characteristic curve corresponding to a relatively wet state, employed for an interpolation or an extrapolation of linearity in between to be made for estimation, as necessary.

Further, the potential output power estimator 71 may well have an increased number of characteristic curves, to decrease the distance of interpolation for estimation of a potential output power of the fuel cell stack 5, with a still increased precision.

Further, the potential output power estimator 71 has a described estimation process iterated at intervals of a prescribed time slot. In this regard, there can be increased currents required by vehicle loads, such as those at the inverter 3. Hence, the potential output power estimator 71 can have a decreased error between an actual potential output power and an estimated potential power, as the output power of the fuel cell stack 5 approaches a maximum.

Accordingly, the vehicle 1 can avoid such situations as taking out an excessive current from the fuel cell stack 5, thus permitting vehicle loads to be supplied with sufficient powers, allowing for favorable control of vehicle loads.

Figure 5:
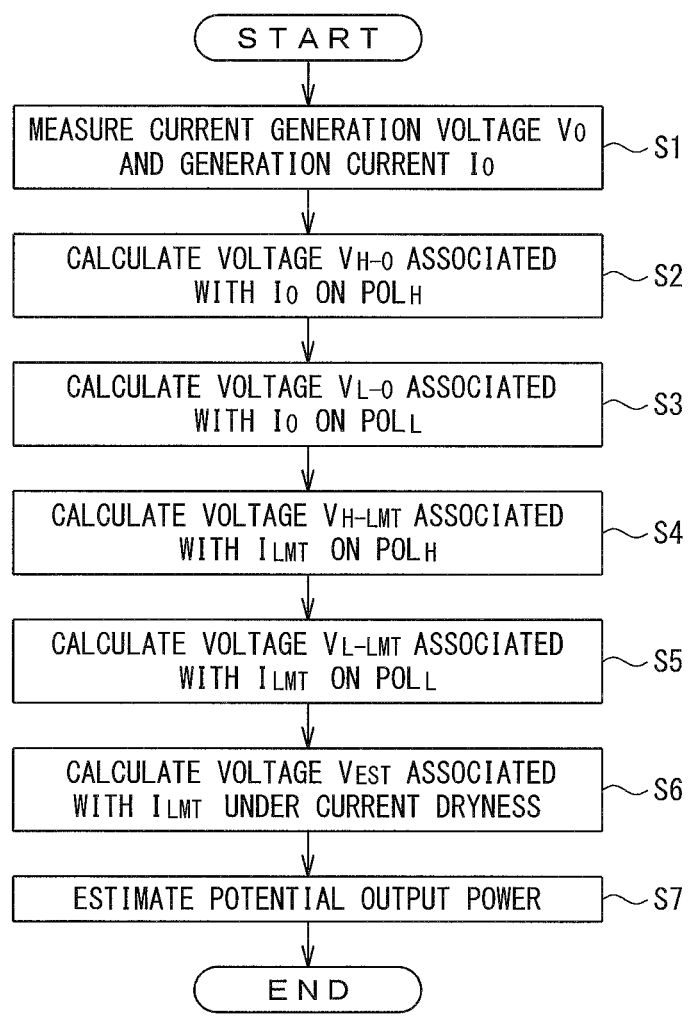
FIG. 5 is a flowchart showing a procedure for a processing of estimating an electric power that can be output by the fuel cell stack, as a figure describing a fuel cell system according to an embodiment of this invention.

There will be descried a potential output power estimation process in the fuel cell system described, with reference to FIG. 5. The potential output power estimation process to be described is started when the ECU 7 starts operation, and iterated at intervals of a prescribed time slot.

First, at a step S1, the potential output power estimator 71 controls the working point measuring section 51 to measure a combination of a current generation voltage $V_O$ and a current generation current $I_O$.

At a subsequent step S2, the potential output power estimator 71 operates for calculations to determine a generation voltage $V_{H-O}$ associated with the generation current $I_O$ on a characteristic curve $POL_H$ stored in the output characteristic map memory 72.

At a subsequent step S3, the potential output power estimator 71 operates for calculations to determine a generation voltage $V_{L-O}$ associated with the generation current $I_O$ on a characteristic curve $POL_L$ stored in the output characteristic map memory 72.

At a subsequent step S4, the potential output power estimator 71 operates for calculations to determine a generation voltage $V_{H-LMT}$ associated with a given potential generation current $I_{LMT}$ on the characteristic curve $POL_H$ stored in the output characteristic map memory 72.

At a subsequent step S5, the potential output power estimator 71 operates for calculations to determine a generation voltage $V_{L-LMT}$ associated with the potential generation current $I_{LMT}$ on the characteristic curve $POL_L$ stored in the output characteristic map memory 72.

At a subsequent step S6, the potential output power estimator 71 employs the expression (2) for calculations to estimate a generation voltage $V_{EST}$ to be associated with the potential generation current $I_{LMT}$ under a current dryness.

And, at a step S7, the potential output power estimator 71 operates for calculations to estimate a potential output power based on the estimated generation voltage $V_{EST}$ and the potential generation current $I_{LMT}$ under a current dryness. Then, it goes to an end of this process.

It is noted that, when the potential generation current $I_{LMT}$ is given as a variable with a specified domain, the domain may well be divided into significant sections (e.g. in the manner of consecutively changing a value set in advance as a provisional), followed by iterations of a sub-routine composed of steps involving the steps S4 to S7 (both inclusive) in the flowchart of FIG. 5, each time for processing a provisional generation current $I_{LMT}$ as a representative value of an associated section, to thereby estimate a set of potential output powers of the fuel cell stack 5, as candidates for a final step to select a maximal one to be a potential output power.

The ECU 7 may take a course of increasing a generation current of the fuel cell stack 5, by repeating a process of controlling a generation voltage and the generation current, to achieve a potential output power estimated by the potential output power estimator 71. In such the course also, the potential output power estimation process shown in FIG. 5 is iterated, having a decreased error between an estimated potential output power and an actual potential output power, as the generation current approaches a potential generation current $I_{LMT}$.

According to embodiments herein, the potential output power estimator 71 is adapted for employing a set of characteristic curves associated with different dryness conditions of electrolytes, to estimate a potential generation voltage $V_{EST}$. In this regard, there may well be employed output characteristics prepared in consideration of local temperatures of the fuel cell stack 5. For instance, there may well be a set of characteristic curves associated with different dryness conditions (e.g. a driest condition and a wettest condition) of electrolytes prepared every unit domain of a temperature coordinate space defined by a combination of temperatures detected by a combination of temperature sensors (e.g., a suction air temperature sensor and a discharge gas temperature sensor) of the fuel cell stack 5. Such the set of characteristic curves may well be stored in the output characteristic map memory 72, and employed by the potential output power estimator 71 to estimate a potential generation voltage $V_{EST}$ at a working point associated with a coordinate of a temperature vs dryness coordinate space, by using a principal concept of the potential output power estimation process shown in FIG. 5.

Such being the case, according to embodiments herein, the fuel cell system described includes a working point measuring section 51 configured to measure a combination of a current generation voltage and a current generation current of a fuel cell stack 5, an output characteristic map memory 72 configured to store a set of output characteristics of the fuel cell stack 5, and a potential output power estimator 71 configured for employing a combination of a current generation voltage $V_O$ and a current generation current $I_O$ measured by the working point measuring section 51 and a set of pieces of information stored in the output characteristic map memory 72, as bases to estimate a potential output power of the fuel cell stack 5.

Accordingly, there can be achieved an estimation of a potential output power of the fuel cell stack 5 on bases of a combination of a current generation voltage $V_O$ and a current generation current $I_O$ and a set of empirical output characteristics associated with dryness conditions (specifically, those conditions involving various physical and chemical conditions such as temperatures) of electrolytes of the fuel cell stack 5. Hence, there can be achieved an estimation of a potential output power of the fuel cell stack 5, without needing direct detections of such dryness conditions at electrolytes of the fuel cell stack 5.

Further, the potential output power estimator 71 is configured to estimate a potential output power of the fuel cell stack 5 based on a combination of the current generation voltage $V_O$, generation voltages $V_{L-O}$ and $V_{H-O}$ associated with the current generation current $I_O$ on output characteristics $POL_L$ and $POL_H$, and generation voltages $V_{L-LMT}$ and $V_{H-LMT}$ associated with a potential generation current $I_{LMT}$ on the output characteristics $POL_L$ and $POL_H$.

By doing so, there can be achieved an estimation of a potential output power of the fuel cell stack 5 based on an actual observed generation voltage $V_O$, a combination of generation voltages $V_{L-O}$ and $V_{H-O}$ associated with an actual observed generation current Jo on the output characteristics $POL_L$ and $POL_H$, respectively, and a combination of generation voltages $V_{L-LMT}$ and $V_{H-LMT}$ associated with a given potential generation current $I_{LMT}$ on the output characteristics $POL_L$ and $POL_H$, respectively. Accordingly, there can be a potential output power of he fuel cell stack 5 estimated with an increased precision.

Further, the potential output power estimator 71 is configured to employ a linearity between characteristic curves $POL_L$ and $POL_H$ as maps of the output characteristics on a voltage vs current coordinate plane (FIG. 4), as a basis to estimate a potential generation voltage $V_{VEST}$ associated with a potential generation current $I_{LMT}$ stored in the output characteristic map memory 72 from a current working point ($I_O$, $V_O$) defined by the combination of the current generation voltage $V_O$ and the current generation current $I_O$, to thereby estimate the potential output power ($V_{EST} \times I_{LMT}$).

Therefore, according to embodiments herein, the fuel cell system can estimate a potential output power of the fuel cell system with a still increased precision.

While embodiments of this invention have been described, it is apparent that some artisan could have made changes without departing from the scope of this invention. It is intended that any and all such modifications and equivalents are involved in the appended claims.

What is claimed is:

1. A fuel cell system comprising:
a fuel cell configured for an electrochemical reaction of a fuel gas to generate an electric power;
a working point measuring section configured to measure a working point defined by a combination of a generation voltage and a generation current of the fuel cell;
an output characteristic map memory configured to store a set of maps which map varying voltage versus current characteristics of the fuel cell for different wetness states of electrolytes; and
a potential output power estimator configured to estimate a potential output power of the fuel cell based on a combination of a current generation voltage and a current generation current measured by the working point measuring section and a set of information stored in the output characteristic map memory.

2. The fuel cell system according to claim 1, wherein the potential output power estimator is configured to estimate the potential output power of the fuel cell based on the current generation voltage, generation voltages associated with the current generation current at different wetness states stored in the output characteristic map memory, and generation voltages associated with a given potential generation current of the fuel cell based on the map of varying voltage versus current characteristics in the output characteristic map memory.

3. The fuel cell system according to claim 1, wherein the potential output power estimator is configured to employ a linearity between characteristic curves of the output characteristic map memory on a voltage versus current coordinate plane, as a basis to estimate a potential generation voltage associated with a potential generation current stored in the output characteristic map memory from a current working point defined by the combination of the current generation voltage and the current generation current, to thereby estimate the potential output power of the fuel cell.

4. The fuel cell system according to claim 1, wherein the output characteristic map memory stores at least a first power output curve corresponding to a dry electrolyte state and a second power output curve corresponding to a wet electrolyte state;
wherein the working point measuring section determines a first working point as a combination of a first generation voltage and a first generation current;
wherein the potential output power estimator determines a relationship between the first working point and the first and second power output curves based upon distances between the first working point and the first and second power output curves, and further wherein the potential power output estimator is configured to estimate a power output of a second working point based on: (1) the relationship of the first working point to the first and second power output curves, and (2) a given potential generation current for the second working point.

* * * * *